United States Patent [19]

Task et al.

[11] 4,257,164
[45] Mar. 24, 1981

[54] OPTICAL PROTRACTOR

[75] Inventors: Harry L. Task, Dayton; Ross J. Gafvert, Enon, both of Ohio

[73] Assignee: The United States of America as represented by the Secretary of the Air Force, Washington, D.C.

[21] Appl. No.: 959,050

[22] Filed: Nov. 9, 1978

[51] Int. Cl.³ .............................................. G01B 11/26
[52] U.S. Cl. ..................................... 33/1 N; 350/112; 356/138; 356/247
[58] Field of Search ................ 33/1 N; 356/138, 247; 350/112

[56] References Cited
U.S. PATENT DOCUMENTS 3,463,593   8/1969   Horan ................................. 356/142

*Primary Examiner*—William D. Martin, Jr.
*Attorney, Agent, or Firm*—Joseph E. Rusz; Casimer K. Salys

[57] ABSTRACT

An optical device for measuring the angles formed between a line-of-sight and the normal to a planar surface intersected thereby. A solid piece of optically transparent material having a relatively large index of refraction is geometrically shaped to have a planar base surface, with a reference mark theron, and a curvilinear viewing surface with scale marks to designate angular orientations. The exterior surfaces are optically polished to create mirrored surfaces for internal reflection. To accentuate contrast, the planar surface containing the reference mark is coated with a layer of contrasting opaque material. Angles are measured by placing the planar base surface of the device on the planar surface intersected by the line-of-sight and aligning the reference mark with the point of intersection. When viewed from the observation point defining the line-of-sight, an image of the reference mark appears on the scaled surface at a location representing the line-of-sight angle.

10 Claims, 10 Drawing Figures

OPTICAL PROTRACTOR

RIGHTS OF THE GOVERNMENT

The invention described herein may be manufactured and used by or for the Government of the United States for all governmental purposes without the payment of any royalty.

BACKGROUND OF THE INVENTION (1) Field of the Invention

This invention is in the field of optical angle measuring devices, and in particular those devices which provide a high contrast direct reading of the composite angle, or its constituents, between an observer's line-of-sight and the normal to a planar surface intersected thereby.

(2) Description of the Prior Art

Conventionally, the magnitude of the composite angle, the compound angle between a line-of-sight and the normal to a planar surface, or the constituent angles, the individual angles forming the composite, are determined by a combination of mechanical distance and angle measurements. The process of making such measurements is not only tedious but fraught with opportunities to introduce errors considering the number and interrelationship of the measurements required.

The human factors engineer is often confronted with this problem, occurring with particular frequency when the line-of-sight of a pilot-observer is being analyzed during the design or verification testing of an instrument layout in an aircraft cockpit. Since there are a large number of individual instruments and panels, each of which must conform to the established standard, and the observer is defined to view from any point within an entire envelope of head positions, the evaluation of a single cockpit layout becomes a formidable task when protractors, rulers and the laws of geometry are the available tools.

SUMMARY OF THE INVENTION

The subject of this invention is an optical angle measuring device particularly suited for determining the angles formed between a line-of-sight and the normal to a planar surface intersected thereby. In use, the flat surface of the device is placed flush against the planar surface and the reference mark on the device is aligned with the intersection point of the line-of-sight. The angle measurement appears on the scaled surface of the device as an image of the reference mark when this surface is viewed from the point of observation defining the line-of-sight. If the angle sought is to be in a prescribed plane, the device is rotated about the intersection point to the appropriate planar orientation.

In its various embodiments the invention utilizes spherical, conical or cylindrical surface in conjunction with its planar surface base. It is fabricated from a solid piece of transparent material having a relatively large index of refraction and polished exterior surfaces. By means of total internal reflection, an image of the reference mark on the base appears on the curved, scaled surface of the device and moves in unison with the line-of-sight angle. In a like fashion, the deposition of an opaque material on the surface containing the reference mark produces an image thereof, in the form of a dark background, on the scaled surface. A judicious choice of colors for the reference mark, scale and opaque material creates a viewing surface which is both high in contrast and visual appeal.

DESCRIPTION OF THE PREFERRED EMBODIMENT

Figure 1:
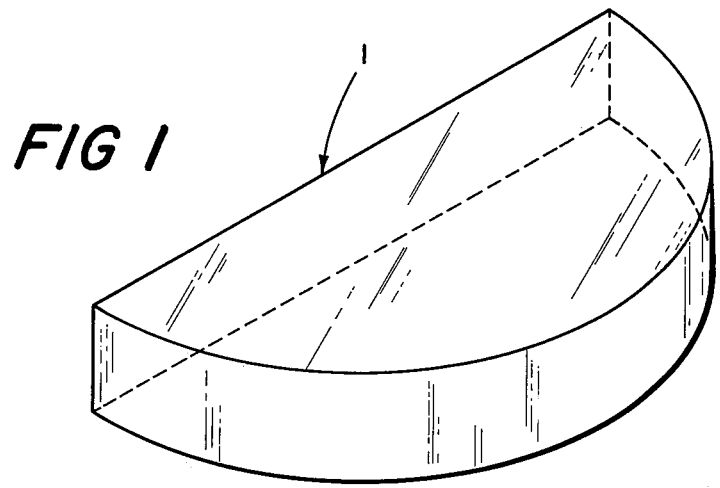
FIG. 1 shows one embodiment in a perspective view to portray its geometric shape.

The shape of one embodiment for this invention is depicted in FIG. 1. Geometrically, it has the external shape of a half cylinder, otherwise describable as a half disk or a protractor with a defined thickness. The material from which the device is fabricated is optically transparent acrylic plastic, though alternate materials such as polycarbonate or high index of refraction glass would function equally well. Irrespective of the material selected, the interior of the device should be solid and all external surfaces polished sufficiently to allow internal reflection.

Figure 2:
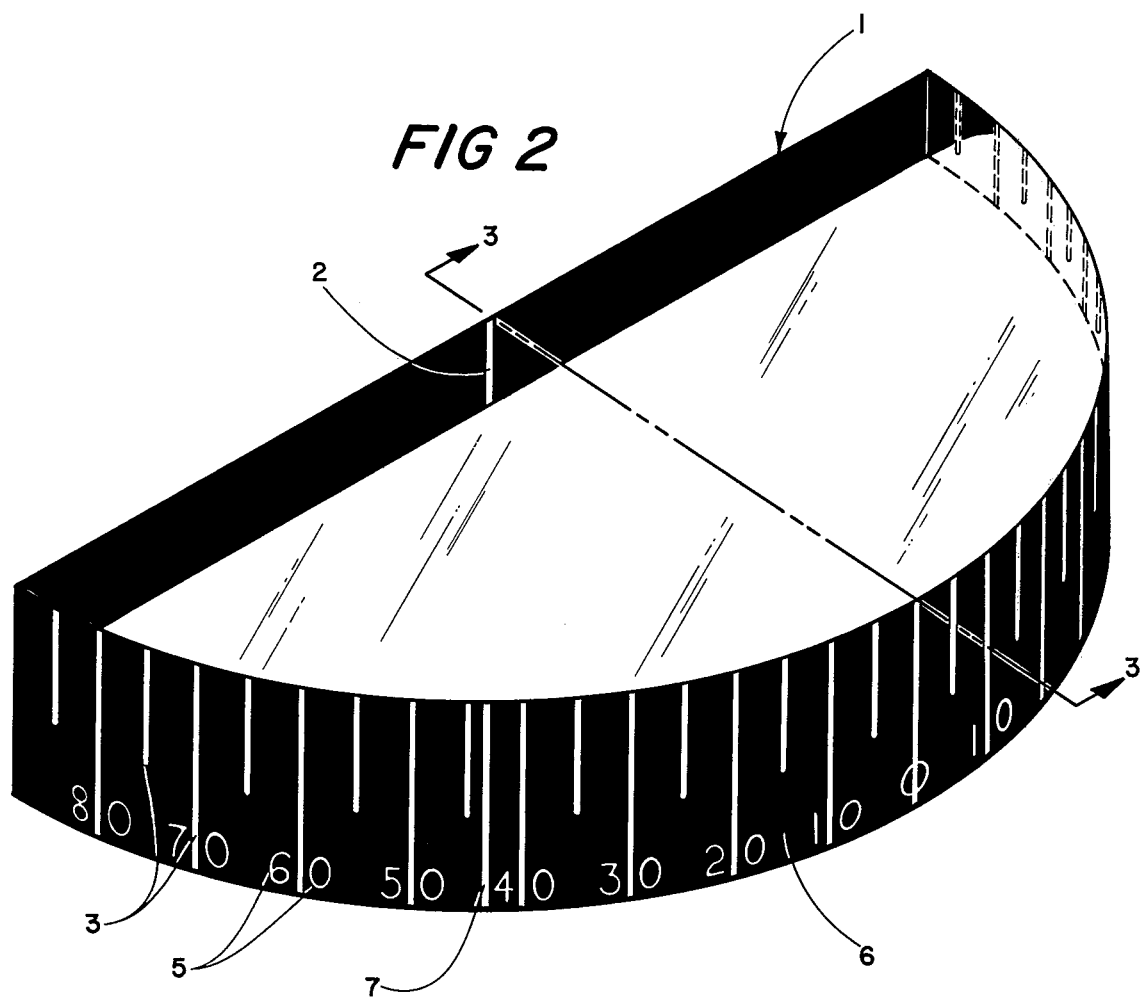
FIG. 2 shows the device in FIG. 1 as it actually appears.

The actual visual appearance of the complete device is perspectively shown in FIG. 2. Base surface 1 of the device, namely the flat surface created when the cylinder is axially bisected, is scribed with reference mark 2, coincident with the axis of the geometric cylinder. Curved outer surface 6 is scribed similarly with scale marks 3 which are aligned parallel to the cylindrical axis and located in proportion to the angular displacement about the curved surface. A series of numbers, designated by reference numeral 5, is engraved into curved outer surface 6 at locations corresponding to their respective scale mark.

To accentuate the visual contrast between the transparent body of the device and the scribe marks, the marks and engravings are filled with white paint while base 1 is coated with black paint. When fabricated in this way the device appears to have white scale marks 3 and white image 7 of reference mark 2 displayed against a contrasting black background, the background being an image of the black paint on base surface 1.

Figure 3:
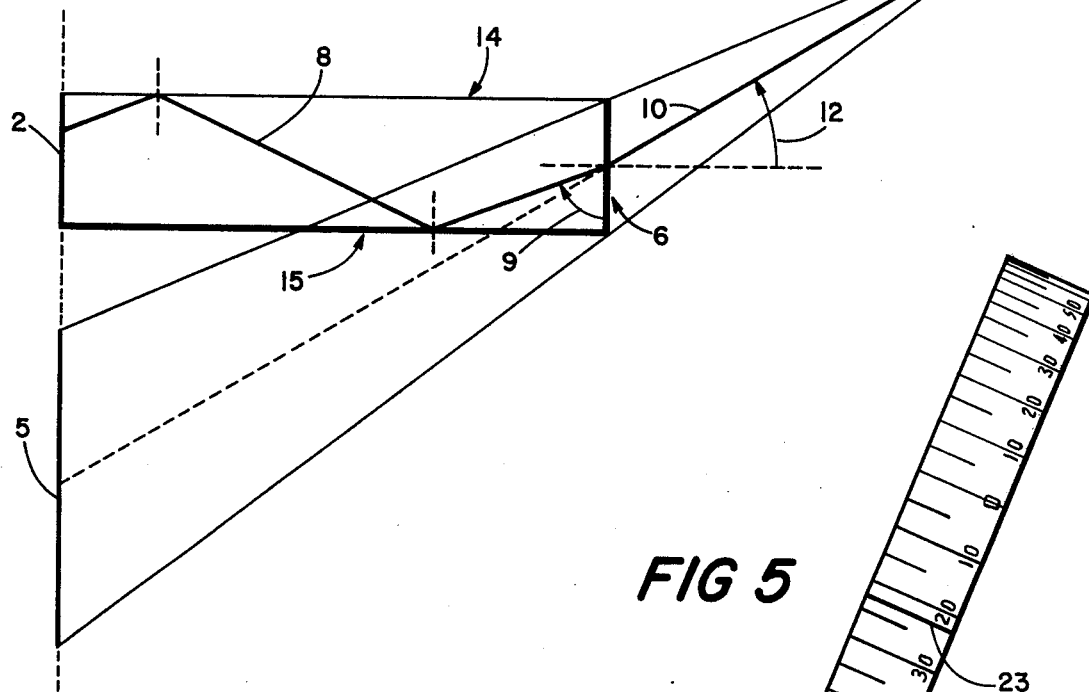
FIG. 3 is a cross-sectional schematic of the device taken at the location designated in FIG. 2.

The optical characteristics of this embodiment are preferably described with reference to FIG. 3. The cross-sectional schematic shown in this figure is taken at section line 3—3 in FIG. 2. Since the outer surfaces of the device are polished to an optically smooth finish, nearly all the light energy leaving reference mark 2 along paths such as 8 is reflected internally until it reaches curved surface 6. At that point, light energy traveling along path 8 forms a sufficiently large angle of incident 9 to pass through surface 6 and along path 10 to observer 11. For this embodiment of the device, viewing angle 12 is in all cases limited to less than 90 degrees either direction from the normal to surface 6. When observer 11 views curved surface 6 along line-of-sight 10 he sees an image of reference mark 2, whose locus of points forms line 5 coincident with the axis of reference mark 2. Though image line 5 is shown to extend downward in the figure, moving observer 11 below the normal to surface 6, i.e. reversing angle 12, would create a similar locus above reference mark 2. The black background against which reference mark 2 is viewed appears on the face of surface 6 by an analogous process of internal reflection.

Scratches and surface imperfections will tend to blur the image appearing on surface 6, particularly the image of reference mark 2. A lack of parallelism between upper surface 14 and lower surface 15 has the effect of tilting and displacing the image with respect to scale marks 3 on surface 6.

The material from which the device is fabricated must have an index of refraction falling within a prescribed range if the imaging attributes described above are to be fully attained. An index of refraction equal to or greater than 1.414 produces the internal reflections necessary to create images of the reference mark and blackened background. A lesser value will severely limit viewing angle 12, effectively shrinking it to a range over which reference mark 2 and the blackened background are viewed directly rather than by reflected image. The usefulness of the device to measure constituent angles in specified planes, described hereafter with reference to FIG. 6, would also be severely limited if the material's index of refraction is less than 1.414. Though a layer of reflective material could be deposited onto surfaces 14 and 15 to create the mirrored internal surfaces when the index of refraction is below 1.414, such an obstruction of background light would significantly limit the illumination, and therefore the visibility, of reference mark 2.

The apparent presence of a black background is similarly affected by the index of refraction. As long as the index remains greater than 1.414 surface 6 appears black when viewed from nearly all angles; the limited exceptions being when angle 24 in FIG. 6 approaches either plus or minus 90 degrees. Nevertheless, contrast for reference mark 2 remains since the image of the mark continues to be situated in the center of the remaining black field, as the visually perceived image of this field shrinks at the extremes.

An absence of errors attributable to parallax is a further distinguishing feature of this embodiment. Again referring to FIG. 3, if upper surface 14 and lower surface 15 are parallel, and the base surface on which reference mark 2 resides is perpendicular thereto, image 5 remains coaxial with reference mark 2. With this image location, no error attributable to parallax arises between image 5 and peripheral scale marks 3 when the two are viewed by observer 11.

Figure 4:
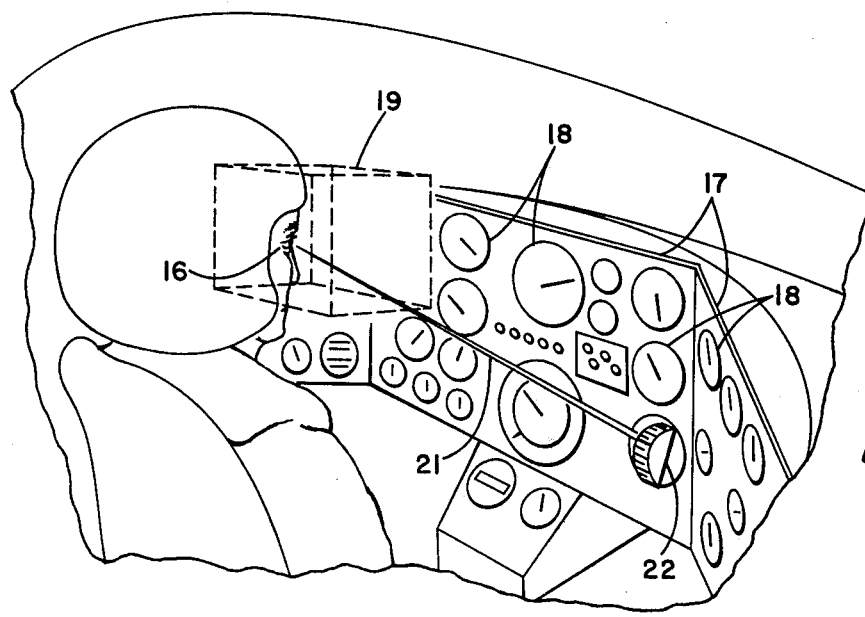
FIG. 4 depicts one manner by which the device may be used to measure composite angles.

The particular embodiment described above was designed and fabricated for the measurement of composite viewing angles during the human factors engineering analysis fo aircraft cockpit instruments and panels. FIG. 4 depicts a typical application, in which observer 16 is seated before a panel structure 17 containing multiple instruments 18 at diverse viewing angles. The design requirement prescribes that observer 16 must be capable of viewing instruments 18 from any point within head movement envelope 19 without exceeding specified angle limits between the normal to the face of the instrument being viewed and line-of-sight 21. In such an application the embodiment serves both as an angle measuring tool to establish reasonable standards for composite angle and as a test instrument to verify conformance to those standards.

Figure 5:
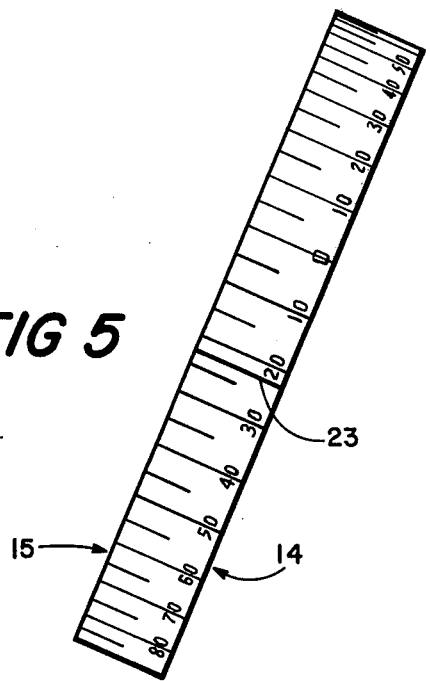
FIG. 5 depicts the appearance of the observed scale when the device is used with the procedure described to FIG. 4.

To use the device appearing in FIG. 2 for measuring composite angles of the form depicted in FIG. 4, base surface 1 of the device is placed flush on the exposed surface of the instrument. If the face of the instrument is so large as to permit diverse locations of the device, accuracy may dictate that the midpoint of reference mark 2 be aligned with a reference location, such as the center of the instrument face. The device is then rotated until upper surface 14 and lower surface 15 are no longer visible to observer 16. In this orientation surfaces 14 and 15 are nearly parallel to the line-of-sight. Curved surface 6 of the device now appears as shown in FIG. 5. The composite angle is designated by image 23 of reference mark 2. For the particular case depicted, line-of-sight 21 is at a composite angle of 22 degrees from a direct normal to the face of the instrument. The angles for other head locations are similarly obtained in comparatively rapid succession.

It is worthy to note that the geometric structure and optical response of the device described with reference to FIG. 2 is relatively insensitive to errors in the alignment of upper surface 14 and lower surface 15. Thereby, subjective errors introduced during the single mechanical operation, i.e. rotating the device until surfaces 14 and 15 are not visible, are effectively suppressed.

Figure 6:
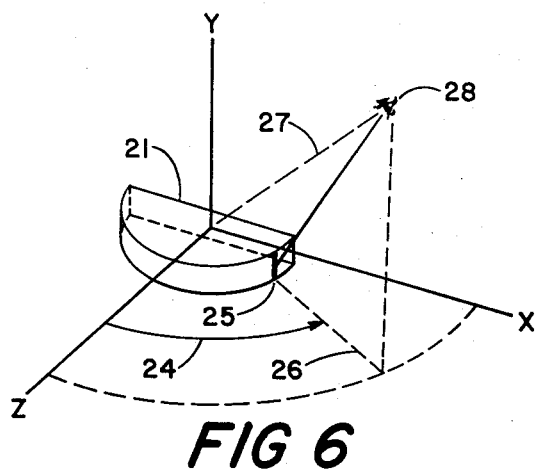
FIG. 6 contains a schematic depicting the device when it is being used to measure the constituent angle in XZ plane.

Another refinement in the use of the device embodied in FIG. 2 appears schematically in FIG. 6. In this particular case the device is being utilized to measure angle 24, where angle 24 is that formed between line-of-sight component 26, a projection of line-of-sight 27 onto the X-Z plane, and the Z axis. Base 1 of the device is flush with the X-Y plane while upper and lower surfaces, 14 and 15, are parallel to the X-Z plane. Since line-of-sight 27 extends between observer 28 and the geometric origin, the midpoint of reference line 2 on the device must also be located at the origin. The magnitude of angle 24 appears as an image 25 on curved surface 6 of the device when the curved surface is viewed by observer 28.

The invention also contemplates a broad range of additional embodiments whose functional structure and operation are analogous to those underlying the foregoing embodiment. These variants appear schematically in FIGS. 7 through 10. Each is unique in its geometry and mode of operation, yet, all are natural evolutions of the basic structure appearing in FIG. 2.

Figure 7:
FIG. 7 is a perspective view showing the geometric shape of an embodiment which is greater than half a cylinder.

FIG. 7 shows a structure of cylindrical geometry in which greater than half the cylinder remains, in contrast to that appearing in FIG. 1 where exactly one half is used. The reference mark is again coincident with cylindrical axis 29. Though base surfaces 31 and 32 are no longer coplanar, they are blackened to accentuate the contrast with the white of the reference mark. In view of the description covering the structure in FIG. 2, it is readily apparent that the angular range on surface 30 over which the black background appears is reduced as the proportion of the cylindrical segment increases. No less contemplated is a geometric structure in which less than than half the cylinder constitutes the device.

Two particular types of uses are foreseen for the embodiment in which the device is geometrically either greater or less than one half a cylinder. If the surface to which the line-of-sight extends is in the form of an outwardly extending corner, an embodiment of the form appearing in FIG. 7 permits angle measurements spanning a range greater than 180 degrees. Obviously, an analogous situation occurs when a device of less than 180 degrees is used to measure angles within an inwardly extending corner. As a second use, consider attaching the device to a body which is capable of being rotated about an axis coincident with the cylindrical axis, such as a camera tripod. Attaching a reference pointer to fixed location permits the angular orientation of the body to be read directly from the scaled surface of the device when the reference pointer and reference mark image are aligned.

Figure 8:
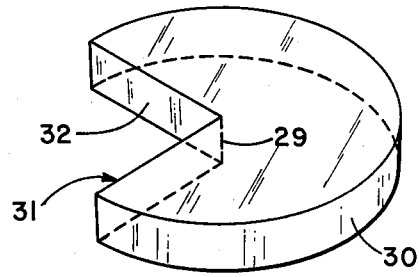
FIG. 8 is a perspective view of a geometric embodiment in which the end surfaces of the half cylinder are not parallel.
Figure 8:
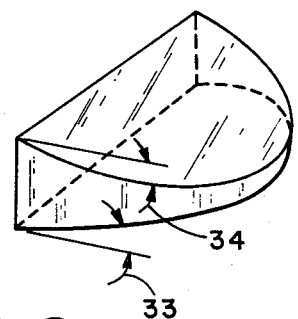

Another variant of the basic geometry shown in FIG. 1 appears in FIG. 8. The previous parallel ends of the half cylinder, upper surface 14 and lower surface 15, are now inclined at equal angles 33 and 34. Though this embodiment foregoes the ability to disect a composite angle into its constitutent components by merely rotating the device, as described with reference to FIG. 6, it retains the ability to measure composite angles, such as those sought with reference to FIG. 4. The restriction in the angle from which an observer must view the scaled surface tends to relegate this embodiment of the device to particularly unique applications.

Figure 9:
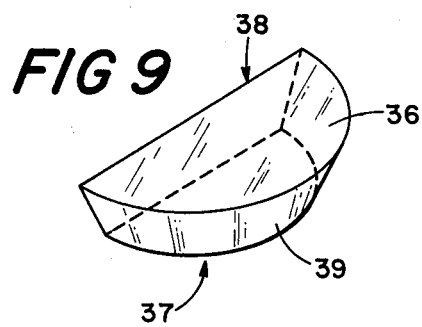
FIG. 9 presents a perspective view of another geometric structure similar to that shown in FIG. 1, except that the curved surface is a conical segment.

FIG. 9 contains the geometric shape of a different embodiment. The embodiment appearing in this figure retains the parallel relationship of upper surface 36 and lower surface 37, and perpendicularity with base surface 38. The distinguishing feature of this structure lies in the shape of curved surface 39, since this surface is now conical rather than cylindrical in shape. Though the scale marks on curved surface 39 must be orientated to compensate for the radius differences in surfaces 36 and 37, this embodiment otherwise operates no differently than the geometric structure appearing in FIG. 1.

The concial embodiment appearing in FIG. 9 is particularly suited for making measurements of the type described with reference to FIG. 6. The tilt of the scaled surface allows observer 28 to view such a device from a higher relative position along the Y axis. In general, as the slant of the conical surface becomes more abrupt and the material's index of refraction rises the allowable viewing angle between observer 28 and the X-Z plane also increases.

Figure 10:
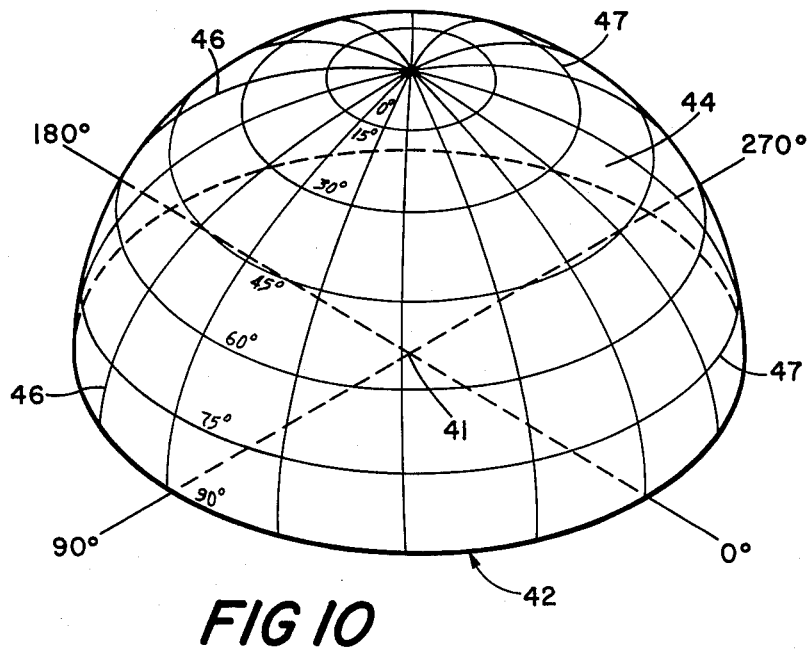
FIG. 10 contains another embodiment, schematically shown in the perspective, wherein the device exhibits the shape of a hemisphere.

A further refinement of the invention is embodied in the geometric structure depicted in FIG. 10. The device has the form of a hemisphere with the referencce mark at the spherical center. Reference mark 41, a point, is again colored white to accentuate the contrast between it and the remainder of the planar surface. Spherical surface 44 is partitioned by lines 46 and 47 to create a coordinate system similar to that constituted by conventional lines of longitude and latitude, respectively. The image of reference mark 41, also appearing as a point, provides a highly contrasted direct measure of the angles contributing to the line-of-sight when planar surface 42 is placed flush against the surface being analyzed. An embodiment with less than a full hemisphere is also contemplated as long as the structure retains a piece of spherical surface 44 and spherical center reference mark 41.

Once the device appearing in FIG. 10 is located on the surface to be measured and rotated to align the longitudinal lines with respect to the instrument reference, the image of reference mark 41 provides a direct reading of two angular quantities. Latitudinal lines 47 are the scale marks which represent the magnitude of the composite angle between the line-of-sight and the normal to the instrument's planar surface. Longitudinal lines 46 indicate the angular orientation of the line-of-sight about this normal, with respect to the previously defined instrument reference.

I claim:

1. An optical device for visually determining the angle between a line-of-sight and the normal to an observed planar surface intersected by the line-of-sight, which is used by placing said device over the intersection and viewing a reference mark on a planar surface of the device through its scaled, curvilinear surface from the line-of-sight viewing point, comprising a solid piece of optically transparent material having a planar surface and a curvilinear surface, said curvilinear surface having rotational symmetry about a reference line on the planar surface, a scale on said curvilinear surface, and a reference mark coinciding with the reference line.

2. An optical device as recited in claim 1, in which said curvilinear surface is the curved face of a geometric cylinder and the ends of the cylindrical body are truncated by a second and a third planar surface.

3. An optical device as recited in claim 2, in which said second and third planar surfaces are respectively parallel to each other and perpendicular to the first mentioned planar surface.

4. An optical device as recited in claims 2 or 3, in which said scale is symmetrically disposed over the curved face of the cylindrical surface, and said optically transparent material has optically polished exterior surfaces, an index of refraction with a magnitude of 1.414 or greater and a coating of opaque material on said first mentioned planar surface.

5. An optical device as recited in claim 1, in which said curvilinear surface is the curved face of a geometric cone, said first mentioned planar surface intersects the cone so as to form a line of intersection coincident with the conical axis and the ends of the conical body are truncated by a second and a third planar surface.

6. An optical device as recited in claim 5, in which said second and third planar surfaces are respectively parallel to each other and perpendicular to said first mentioned planar surface.

7. An optical device as recited in claims 5 or 6, in which said reference mark is coincident with the conical axis, said scale is symmetrically disposed over the curved face of the conical surface, and said optically transparent material has optically polished exterior surfaces, an index of refraction with a magnitude of 1.414 or greater and a coating of opaque material on the first mentioned planar surface.

8. An optical device for visually determining the angle between a line-of-sight and the normal to an observed planar surface intersected by the line-of-sight, which is used by placing said device over the intersection and viewing a reference mark on a planar surface of the device through its scaled, curvilinear surface from the line-of-sight viewing point, comprising a solid piece of optically transparent material having a planar surface and a curvilinear surface, said curvilinear surface having rotational symmetry about a reference point on the planar surface, and a reference mark coinciding with the reference point.

9. An optical device as recited in claim 8, in which said scale is symmetrically disposed over the curvilinear surface.

10. An optical device as recited in claims 8 or 3, in which the optically transparent material has optically polished exterior surfaces, an index of refraction with a magnitude of 1.414 or greater, and a coating of opaque material on the planar surface containing the reference mark.

* * * * *

UNITED STATES PATENT AND TRADEMARK OFFICE
CERTIFICATE OF CORRECTION

PATENT NO. : 4,257,164
DATED : March 24, 1981
INVENTOR(S) : Harry L. Task et al.

It is certified that error appears in the above—identified patent and that said Letters Patent is hereby corrected as shown below:

On The Title Page, Item 73, should read

-- said Gafvert assor. to The United States of America as represented by the Secretary of the Air Force, Washington, D. C.; a part interest --.

Signed and Sealed this

Twenty-seventh Day of October 1981

[SEAL]

Attest:

Attesting Officer

GERALD J. MOSSINGHOFF

Commissioner of Patents and Trademarks